PROJECTION SYSTEM FOR ENHANCED SEQUENTIAL TELEVISION DISPLAY

Filed March 7, 1966 3 Sheets-Sheet 1

Inventor:
KENNETH D. STEPHENS, Jr.
by Lynn G. Foster
Attorney

Dec. 23, 1969 K. D. STEPHENS, JR 3,485,944

PROJECTION SYSTEM FOR ENHANCED SEQUENTIAL TELEVISION DISPLAY

Filed March 7, 1966 3 Sheets-Sheet 2

Inventor:

KENNETH D. STEPHENS, Jr.

by Lynn G. Foster
Attorney

PROJECTION SYSTEM FOR ENHANCED SEQUENTIAL TELEVISION DISPLAY

Filed March 7, 1966 3 Sheets-Sheet 3

Inventor:
KENNETH D. STEPHENS, Jr.
by Lynn G. Foster
Attorney 3,485,944

PROJECTION SYSTEM FOR ENHANCED SEQUENTIAL TELEVISION DISPLAY

Kenneth D. Stephens, Jr., Salt Lake City, Utah, assignor, by mesne assignments, to Electronic Research Corp., Salt Lake City, Utah, a corporation of Utah Filed Mar. 7, 1966, Ser. No. 532,267
Int. Cl. H04n 5/38, 5/44, 3/16
U.S. Cl. 178—5.4 25 Claims

ABSTRACT OF THE DISCLOSURE

A projection system employing eidophor valve techniques for enhancing a sequential television display. There is disclosed herein the projection of sequential color and multi-dimension television signals to provide plural image rasters on one or more eidophor valves corresponding to components of the signals. In a three color television system, for example, three electron guns may be used to produce three separate image rasters either on a single eidophor valve or on three eidophor valves, or a single gun may be controlled to produce the three separate rasters on the valve. The duty cycle of sequential signals is relatively short and, thus, the retention time of each respective image, and consequently the duty cycle thereof, may be controlled by controlling the retention characteristics of the control medium of the eidophor valve. Several methods and apparatuses are disclosed for accomplishing this objective. For example, the eidophor chamber temperature may be controlled such that the rate of image decay is decreased to provide a longer image retention interval for each color component, followed by rapid erasure of the image near the end of the interval by control of heat, erase flux, a smoothing wiper, and so forth.

The present invention relates to a method and apparatus for producing television pictures or the like, and is particularly suited for projection utilizing an eidophor light valve.

The projection of television images through the use of an eidophor valve has been proposed since approximately 1939 and is discussed by Labin in the Journal of the Society of Motion Picture and Television Engineers, vol. 54, April 1950, pp. 393–406. Reference is also made to United States Patents 2,391,450, 2,391,451, and 2,605,352, which describe methods of and apparatus for reproducing television images with high brilliancy through controlling the flux of a separate light source, such as an arc lamp, by means of a deformable control medium acted upon by an electron beam raster which is modulated by the incoming television signals. Hence, a charge pattern is developed on the control medium, which closely corresponds to the raster video content so as to direct and control the light passing through a Schlieren optics.

In contradistinction to the foregoing, this invention provides a system, including method and apparatus, for extending the "duty-cycle" of sequentially codified input information of controlled retention scanned systems. By "duty-cycle extension," as used in this specification, is meant increasing the length of time interval during which an image emanating from sequential input signals is clearly retained and projected by the control medium of the eidophor valve.

Accordingly, a primary object of this invention is to extend the duty-cycle of alternately color-codified information, as, for example in field sequential color.

Another object of the invention relates to duty-cycle extension of alternate intervals comprising a three-dimensional image in one of several configurations.

These and other objects and features of the present invention will become more fully apparent from the following description and appended claims taken in conjunction with the accompanying drawings wherein:

PRIOR ART

Figures 1, 2, 3:
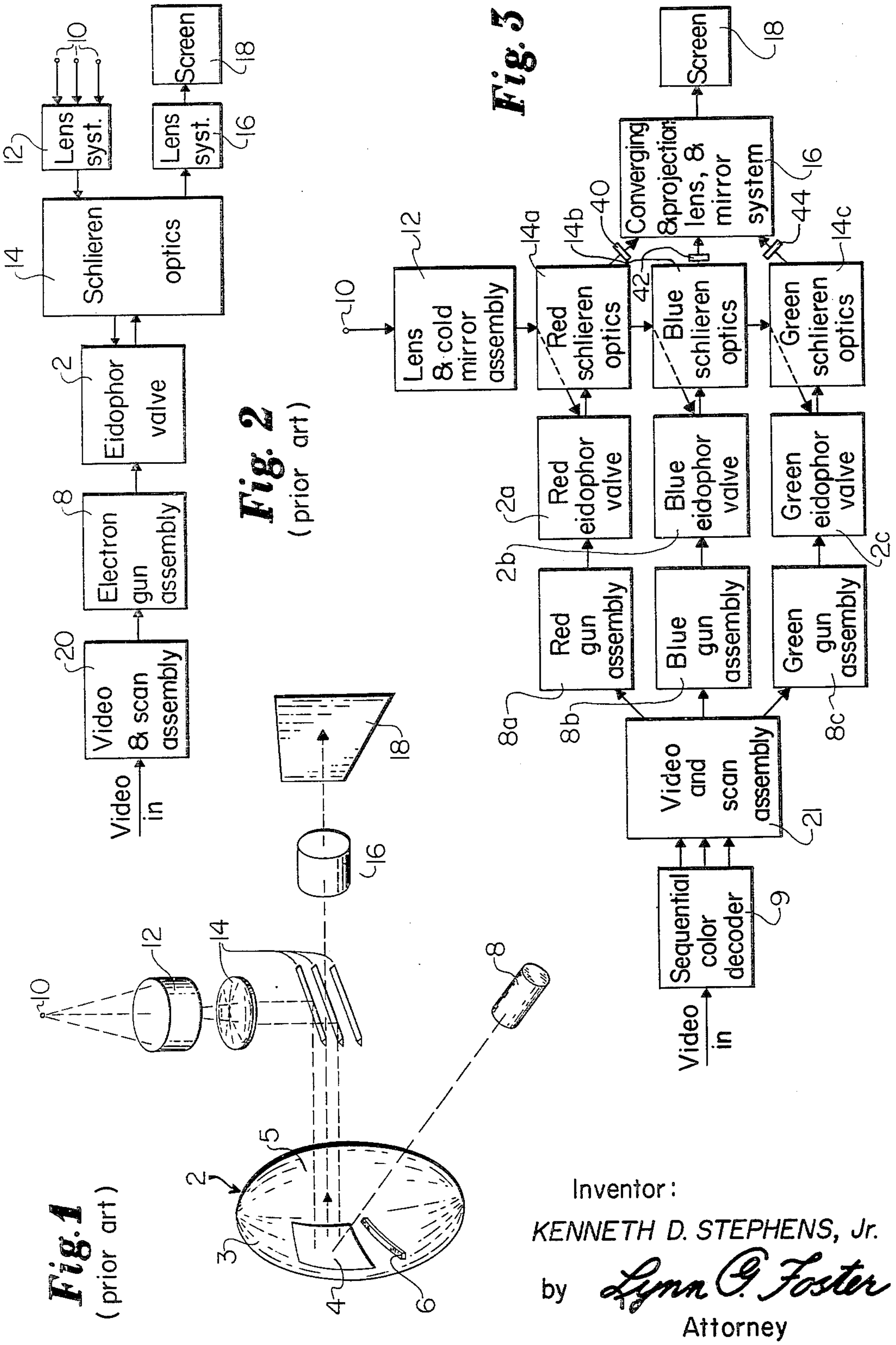
Fig. 1 (prior art), Fig. 2 (prior art), Fig. 3
FIGURE 1 is a schematic representation in perspective of a conventional prior art eidophor projection system.
FIGURE 2 is a block diagram of a projection system similar to that of FIGURE 1.
FIGURE 3 is a block diagram of one presently preferred embodiment of this invention.

In the conventional eidophor projection system depicted in FIGURES 1 and 2, a high velocity electron beam from a gun and yoke assembly 8 scans the surface of a concave mirror 3 covered with a control medium 5, comprising, for example, a fluid such as a mineral oil or an elastic substance. Mirror 3 and control medium 5 are, in combination, known in the art as an eidophor valve, being generally designated by the numeral 2. Conventionally the gun 8 and the eidophor valve 2 are enclosed in a vacuum chamber (not shown), commonly called an eidophor chamber. The mentioned electron beam forms a scanning raster 4 on the control medium 5, and is suitably modulated, as, for example, through beam focus modulation by a television video signal from a video and scan assembly 20 (FIGURE 2). In this way, the characteristics of the deformable control medium are altered so as to control the flux of separate light source 10 through a lens and bar system 14, commonly known in the art as a Schlieren optics. The flux from source 10, which may be an arc light, is gathered and directed first through a system of at least one lens and/or cold mirror 12, and then through the Schlieren optics 14 so as to be directed to scanned surface area at control medium 5 of the eidophor valve 2. Thereafter, depending on the electron beam modulation from gun assembly 8, the mentioned light is reflected from the eidophor valve 2 back into the Schlieren optics which either block or pass the light, depending on the angle of reflection from the eidophor control medium 5. Thereafter the light is gathered and projected by lens system 16 onto a screen 18.

Eidophor valve 2 rotates slowly, for instance at ⅓ r.p.m., with one or more stationary smoothing bars or rollers 6 contiguous with the control medium. The control medium is often removed from an inactive part of valve 2, processed to obviate contamination due to high velocity electron bombardment and replaced before again cooperating with the smoothing bar.

In the above-mentioned conventional configuration, the control medium image retention characteristics are capable of being adjusted, being set at a given time-intensity level, as, for example, 10% of peak in a $\frac{1}{30}$ second interval, by control of eidophor chamber temperature. Erasure of a given image at these levels is then usually effected solely by the higher intensity of the next scanning raster, the new video field contour simply overpowering the former, decayed field.

EMBODIMENT OF FIGURE 3

Reference is now made to FIGURE 3, which depicts a block diagram of a configuration for the simultaneous display of the primary components used to achieve projected images displayed in full color. Unlike the prior art, incoming video signals are serially fed into first the sequential decoder 9 and then the video and scan assembly 21, which sequentially directs, usually in ⅓ time increments, video impulses to three electron gun assemblies. Video and scan system 21 is similar to that represented by numeral 20 in FIGURE 1 above, but, in addition, discriminates between the primary component signals, usually red, blue and green, and channels each component signal into a separate one of electron gun assemblies, 8*a*, 8*b*, and 8*c*. Each gun in turn suitably warps the control medium on an adjoining, though separate eidophor valve, 2*a*, 2*b* and 2*c*. Each eidophor valve 2*a*, 2*b* and 2*c* is associated with a separate Schlieren optics and lens system (14*a*, 14*b* and 14*c*), the three being convergently projected onto a common screen 18 through individual filters 40, 42 and 44, corresponding to red, blue, and green, respectively and, a common lens and mirror system 16.

Control medium image retention characteristics are capable of being selectively regulated, usually by controlling the eidophor chamber temperature so that the rate of image decay between scanning intervals is carefully predetermined. This is done to insure substantial erasure of the previous interval before receiving the next interval-of-scan. Thus, a succeeding image is not visually superimposed upon a preceding image.

In systems using alternate input-codified signal information, as in field sequential color television, duty cycle extension of each codified component may be accommodated by use of the above-mentioned temperature-controlled retention capability of the control medium. For example, when a field sequential color signal train is decoded and directed by color to act upon each of the three mentioned electron guns 8*a*, 8*b* and 8*c* such that alternate fields of red, blue and green, or other suitable colors, are respectively fed to the guns in timed relation. The creation of a lower temperature in the ediphor chamber, due to increased viscosity of the control medium, accommodates increased image retention, tending to fill in the flicker-causing gaps which would normally occur during ⅔ of the time for each decoder color, i.e. during the time periods when no video information is being processed through any one of the three electron guns. If chamber temperature is the only variable utilized, however, a compromise must necessarily be reached between desirable image retention and unwanted smear in the final image.

Retention control can also be achieved through electron beam modulation. Simple beam amplitude modulation tends toward greater image retention, while line deflection modulation or beam focus modulation tend toward less retention. Thus, combinations of beam modulation may be employed resulting in a compromise of one type or another between duty cycle extension and undesirable smear.

EMBODIMENT OF FIGURE 4

Figure 4:
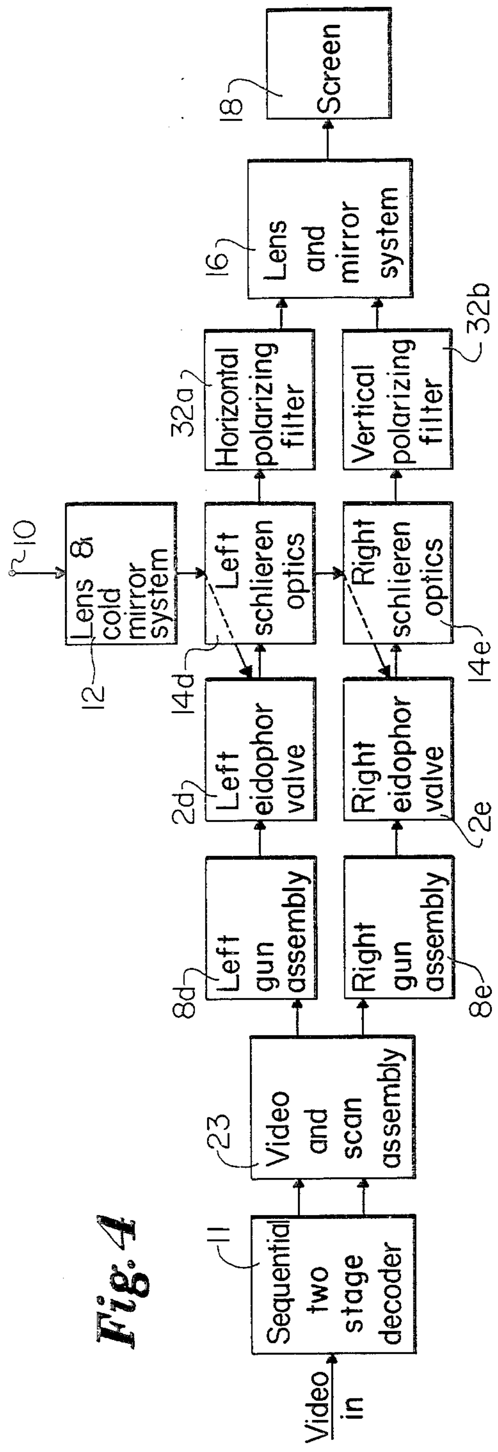
FIGURE 4 depicts a block diagram of another embodiment of the present invention.

Reference is now made to FIGURE 4, which is a block diagram of a novel apparatus for projection of three-dimensional images wherein codified input signals are decoded and identified as either "left" or "right" channel information by sequential two stage decoder 11 and directed by video and scan assembly 23 into the electron gun assemblies 8*d* and 8*e*, designated "left gun" and "right gun," respectively. From here each channel proceeds through a separate eidophor, 2*d* and 2*e*, and separate Schlieren optics systems 14*d* and 14*e*. Each channel is further suitably polarized either before or after passing through lens system 16 so as to be respectively directed to the viewer's left or right eye. One suitable way of accommodating of such polarization is by passing of each channel through a separate polarization filter (see numerals 32*a* and 32*b*), said filters manifesting a certain angle difference, for example on the order of 90°. The viewer, for three-dimensional viewing, in this example could wear a pair of polarized glasses, the plane of polarization in each lens corresponding to the corresponding plane of the filters in units 32*a* and 32*b*.

When the eidophor input information comprises alternate left/right signals, such as field sequential signals, sequential duty cycle extension as described in conjunction with FIGURE 3 is applicable to prolong the useful life of a given projected image, resulting in individual channel pictures of higher brightness, higher contrast, and no visible flicker.

EMBODIMENT OF FIGURE 5

Figure 5:
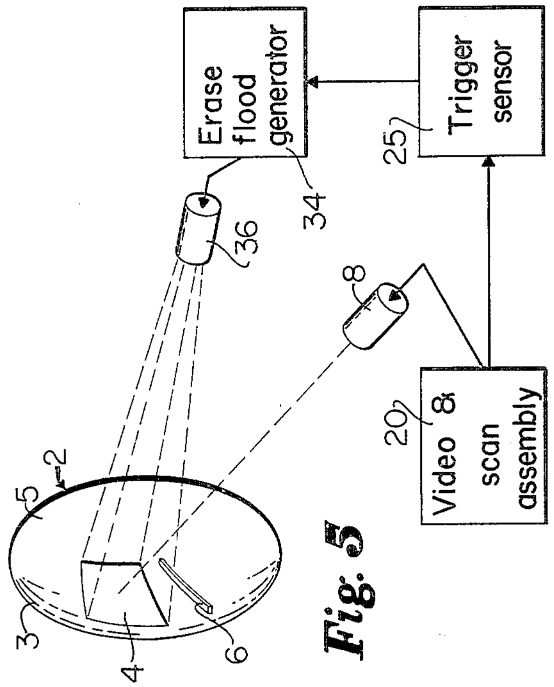
FIGURE 5 is a schematic representation of another embodiment of the present invention.

Reference is now made to FIGURE 5, which depicts another embodiment of this invention whereby sequential duty cycle extension may be achieved separate from or in conjunction with earlier described methods. Video and scan assembly 20 cooperates with at least one electron gun 8 so as to alter or deform a certain area 4 of the control medium 5 of an eidophor/Schlieren optics system, as previously described.

There is also provided a trigger sensor 25, which detects certain predetermined intervals of time, for example, $\frac{1}{60}$ second, in a sample signal from video and scan system 20, and channels corresponding pulse information to an erase flood generator 34 which couples energy into a flood gun assembly 36. Flood gun assembly 36, at certain predetermined relatively short intervals of time, becomes activated to project a flux at the area 4 of control medium 5 at the surface of the eidophor valve 2 to greatly accelerate image deterioration. Examples of the composition of the flux radiated by representative erase gun assembly 36 include electron flooding and R.F. or infra-red periodic heat radiation which break down the tension in the control medium, a suitable gun being selected for each flux type.

EMBODIMENT OF FIGURE 6

Figure 6:
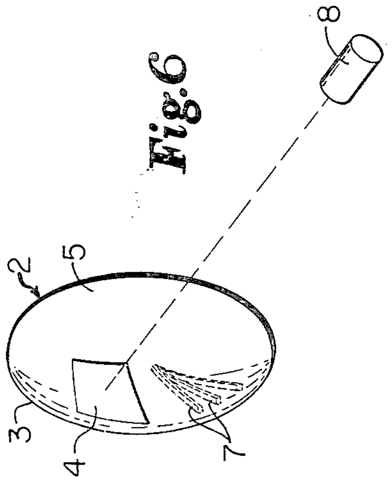
FIGURE 6 is a schematic representation of another configuration according to the present invention.

Reference is now made to FIGURE 6, which depicts another image erasure embodiment applicable in conjunction with or apart from any of the other previously described embodiments. Here, the eidophor valve 2, which is acted upon by the modulated electron beam from gun 8, is provided with apparatus which mechanically erases the eidophor image as the disc 3 is also rotated. For example, at least one rapid-action smoothing wiper bar 7 may be oscillated or otherwise displaced to smooth the deformed control medium 5 and thus erase the image. The mechanical erasure may take place at periodic intervals under control of a trigger sensing/signal generating circuitry similar to that of 25 described in FIGURE 5 above, or may be made to continuously traverse the eidophor surface, being timed to achieve a suitable erasure interval.

EMBODIMENT OF FIGURE 7

Figure 7:
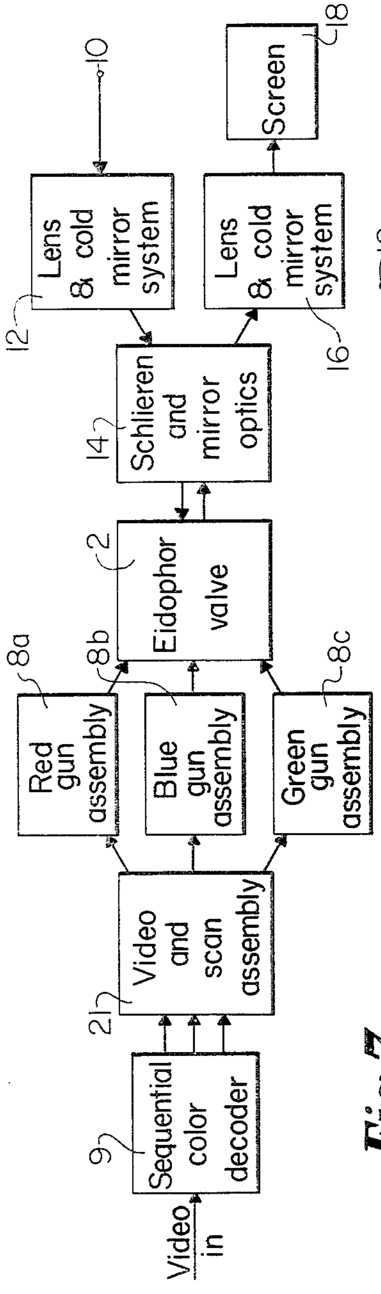
FIGURE 7 is a block diagram of still another configuration of the present invention.

Reference is now made to FIGURE 7, which illustrates another system of image projection through utilization of sequential information transmitted through an eidophor valve. Here, muliple-image rasters are generated in several predetermined positions on the surface of the control medium of a single eidophor valve. Light is directed through a single Schlieren optics in such a way as to recover and utilize the information content of each separate raster. The schematic of FIGURE 7 depicts this system as comprising a three-gun color television reproduction, wherein electron gun assemblies 8*a*, 8*b* and 8*c* are respectively concerned with red, blue and green or other suitably pigmented signals. The system is also applicable to other multi-channel information utilizations, such as three-dimensional television reproduction.

As alternately codified signals, such as sequential color and/or three-dimensional television components, are directed through the system, any of the previously described methods of image duty cycle extension and image erasure resulting from display of the sequentially codified signals may be used to help retain a given image for the desired length of time.

EMBODIMENT OF FIGURE 8

Figure 8:
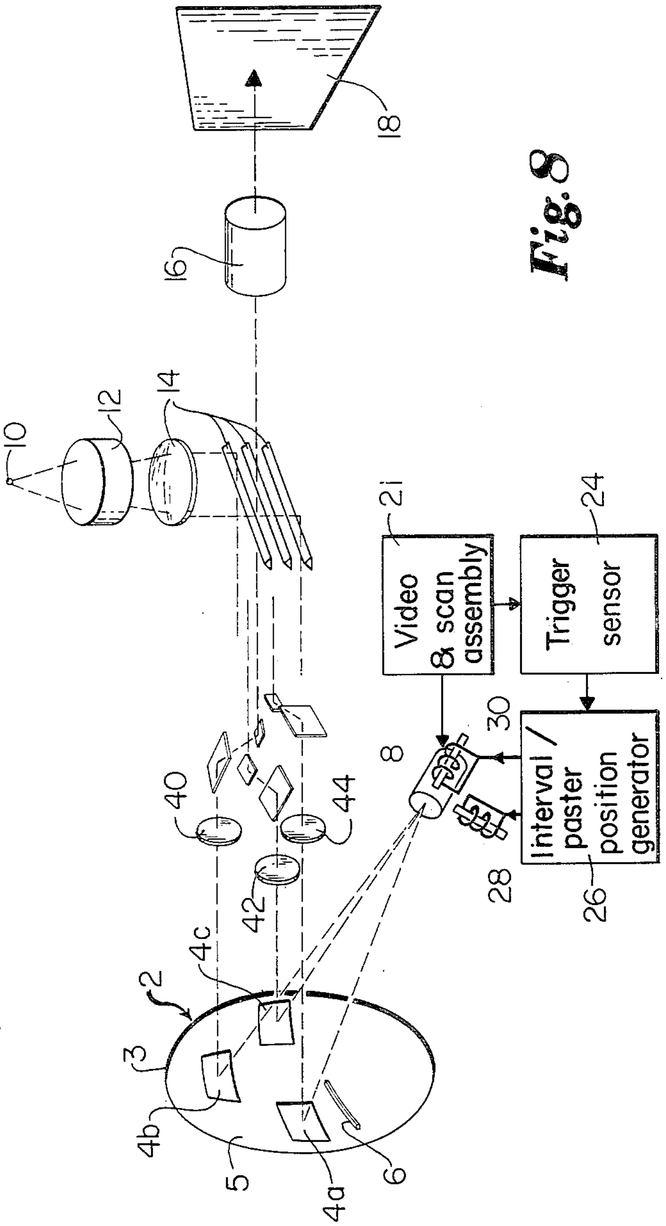
FIGURE 8 is is a schematic representation of still another configuration of this invention.

FIGURE 8 depicts an eidophor-valve-television-image projection apparatus which, when used in conjunction with one or more of the above-described sequential information-duty cycle extension methods, may be used to simply and economically achieve color and/or three-dimensional television reproduction.

Accepting a codified-interval alternate signal train, the system employs an electron gun assembly 8, an eidophor valve assembly 2, and a Schlieren optics 14. Video and scan assembly 21 channels a video sample signal into a special interval trigger sensing circuit 24 which in turn supplies information to an interval/raster position generator 26. Generator 26 generates signals to be fed into special raster position deflection coils 28 and 30, which coils act upon the beam emanating from gun assembly 8.

Electromagnetic coils 28 and 30, shown to respectively control the relative vertical and horizontal raster positions, deflect the electron beam from gun 8 to cause gross beam repositioning at certain intervals, as, for example, during vertical beam retrace between receiving alternately codified video fields containing color and/or three dimensional information. In this manner, one of several predetermined raster positions at the control medium on the eidophor valve assembly will correspond to a certain codified interval, for instance, the red video field information. It can now be seen that light directed from each such raster will pass through an appropriate identification filter system, as for example, red and/or horizontally polarizing. Shown as exemplary in FIGURE 8, these identification filters 40, 42 and 44, are each single-color passing herein corresponding to red, blue, and green respectively. It is further evident that any of previously described sequential information duty cycle extension techniques can be applied to this configuration, and desirable that one or more such techniques be effected.

The controllable image retention characteristics relative to sequential information inherent in system comprising an eidophor valve in the projection of television images may be uilized according to the present invention to achieve certain advantages over the prior art, including more effective display of input-alternated three-dimensional and/or alternating color television signals, and consequently comprise a more economical way of handling and reproducing such signals.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a method of projecting television images, the steps of subjecting a control medium disposed on an eidophor valve to bombardment by at least one scanning electron beam, modulating said beam by sequential codified television signals causing flux emanating from a light source to act upon said control medium to enhance the brilliance of said television images, and precisely controlling the duration retention characteristics of each sequentially projected image disposed upon said control medium whereby the duty cycle of alternately codified component signals is selectively extended to a point in time closely corresponding to the time when display of the next succeeding comparable sequential signal is impending.

2. A method as defined in claim 1 wherein said last mentioned step comprises modulating the beam through velocity, focus, amplitude and like alterations to promote the image retention properties of information sequentially displayed upon the control medium.

3. A method as defined in claim 1 wherein said control medium is a fluid control medium and said last-mentioned step comprises controlling the temperature of the fluid control medium to increase image retention and provide duty cycle extension to enhance the display of sequential input signals.

4. A method as defined in claim 1 wherein said last-mentioned step comprises first prolonging the effective life of each image for a predetermined period and thereafter erasing said images by rapidly surface-heating said control medium.

5. A method as defined in claim 1 wherein said last-mentioned step comprises first prolonging the effective life of each image for a predetermined period and thereafter erasing images through electron flooding.

6. A method as defined in claim 1 wherein said last-mentioned step comprises first the enhancement of image retention for a predetermined period, and thereafter erasing said images by rapid mechanical smoothing of said control medium through high speed movement of wiper means on said control medium.

7. A method as defined in claim 1 wherein incoming sequentially codified video signals alternately modulate the beams of a plural number of electron guns and resulting images are processed using a single eidophor and Schlieren optics system whereby the duty cycle of alternately codified component signals is extended.

8. In a method of projecting sequential television signals to enhance the display thereof, comprising the steps of receiving sequential television signals and forming sequential image rasters on the control medium of an eidophor valve corresponding to signal components of said signals, each of said signal components having a given period, controlling said medium to increase the retention time of each said image raster to an interval greater than said period of each said signal component, and separately controlling the medium to erase each said image raster prior to the end of the respective interval.

9. A method as in claim 8 wherein said medium is controlled to increase the retention of each image raster by controlling the temperature thereof, and is controlled to erase each image raster by applying a flux to said control medium prior to the end of the respective interval.

10. A method as in claim 8 wherein said medium is controlled to increase the retention of each image by controlling the temperature thereof, and is controlled to erase each image raster by controlling a smoothing wiper for said medium in a predetermined maner at near the end of the respective interval.

11. A method as in claim 8 wherein said image rasters are formed by a single electron gun, said electron gun being sequentially controlled to scan each respective image raster on a different portion of said control medium.

12. A method of projecting sequential color television signals to enhance the display thereof, said signals comprising three color components, comprising the steps of receiving said sequential television signals and forming sequential image rasters on the control medium of an eidophor valve corresponding to each respective color component, the signals for each color component having a given period, controlling said medium to increase the retention time of each image raster to an interval greater than said period to extend the duty cycle of each said color component.

13. A method as in claim 12 wherein said control medium is sequentially controlled to erase each respective image raster prior to the end of each respective interval.

14. A method as in claim 12 wherein said sequential image rasters are separately formed at different locations on said control medium.

15. A method as in claim 14 wherein the image rasters formed in separate locations on said control medium are formed by controlling the sequential positioning of a modulated electron beam.

16. In an apparatus for projecting television images in color, a single eidophor valve comprising a control medium which is subjected to bombardment by a single electron gun, a source of sequential color signals comprising plural distinct color components, means applying said color signals to said gun to cause said gun to generate signal modulated rasters upon said control medium, said means responsive to separate color components of said signals for controlling beam positioning from said gun to cause the serial generation of rasters according to respective color components in several positions on said control medium at predetermined intervals of time correlated with the time interval of the respective color components.

17. Apparatus as in claim 16 including means for causing rapid erase of each of said raster serially after said raster exists for a predetermined time on said control medium.

18. Apparatus as in claim 17 wherein said means for erasing includes an erase flood generator responsive to said sequential signals for periodically directing an erasing flux at each of said raster sequentially.

19. Apparatus as in claim 17 wherein said means for erasing includes wiper means mounted adjacent said control media, said wiper means being periodically rapidly moved to erase each of said raster sequentially.

20. Apparatus as in claim 16 including means for selectively extending the effective life of each sequentially generated raster upon the control medium.

21. In an apparatus for projecting sequential television images, eidophor valve means including a control medium which is subjected to bombardment by electrons from elecrton gun means, means for receiving sequential television signals comprising plural sequentially occurring distinct signal components, means applying said television signals to said gun means to cause said gun means to sequentially generate signal modulated rasters according to said signal components upon said control medium, and means for controlling the raster retention characteristics of said control medium to cause each raster to be retained a longer than normal period of time.

22. Apparatus as in claim 21 including means for causing rapid erase of each said raster sequentially after the same has ben retained for said longer than normal period of time.

23. Apparatus as in claim 21 wherein said distinct signal components comprise plural color components.

24. Apparatus as in claim 23 wherein said plural color components comprise red, blue and green color components.

25. Apparatus as in claim 21 wherein said distinct signal components comprise a pair of alternately occurring signal components for forming a three dimensional image display.

References Cited

UNITED STATES PATENTS

| | | | |
|---|---|---|---|
| 2,391,450 | 12/1945 | Fischer. | |
| 2,644,938 | 7/1953 | Hetzel et al. | |
| 2,740,829 | 4/1956 | Gretener | 178—5.4 |
| 2,740,830 | 4/1956 | Gretener | 178—5.4 |

RICHARD MURRAY, Primary Examiner

U.S. Cl. X.R.

178—7.5

UNITED STATES PATENT OFFICE
CERTIFICATE OF CORRECTION

Patent No. 3,485,944 December 23, 1969

Kenneth D. Stephens, Jr.

It is certified that error appears in the above identified patent and that said Letters Patent are hereby corrected as shown below:

In the drawings, Figure 3, blocks 2a, 2b, and 2c, Figure 4, blocks 2d and 2e, "eidophor", each occurrence, should read -- EIDOPHOR --. Column 1, line 17, line 21, second occurrence, lines 27 and 65, Column 2, lines 32, 47 and 67, Column 3, lines 16, 17 and 25, Column 4, lines 33, 44, 47, 62 and 64, Column 5, lines 14 and 15 and line 32, cancel "eidophor", each occurrence. Column 1, line 13, after "employing" cancel "eidophor valve"; line 14, after "niques" insert -- such as through use of an Eidophor valve, --; line 21, after "single" "eidophor" should read -- Eidophor-type --; line 29, "eidophor" should read -- valve --; line 40, "an eidophor" should read -- a --; line 41, after "valve" insert -- , such as electrical valve apparatus known under the name Eidophor valve. --; line 43, "an eidophor valve" should read -- electrical valves of this nature --. Column 2, lines 6 and 24, "eidophor", each occurrence, should read -- valve --; line 30, "as an eidophor" should read -- under the name Eidophor --; line 33, "an eidophor" should read -- a vlave --; line 52, "eidophor" should read -- valve --; line 56, "Eidophor valve" should read -- Valve --. Column 3, line 41, cancel "ediphor"; line 70, "eidophor" should read -- valve --. Column 4, lines 8, 23 and lines 54 and 55, "eidophor", each occurrence, should read -- vlave --; line 61, "an" should read -- a --. Column 5, line 7, cancel "eidophor-"; line 46, "an eidophor" should read --a --; line 66, "eidophor" should read -- electrical --. Column 6, line 32, "eidophor" should read -- valve --; lines 38 and 39, and line 67, Column 7, line 9 and Column 8, line 1, "eidophor", each occurrence, should read -- electrical --.

Signed and sealed this 27th day of April 1971.

(SEAL)
Attest:

EDWARD M.FLETCHER,JR.
Attesting Officer

WILLIAM E. SCHUYLER, JR.
Commissioner of Patents